United States Patent [19]

Stelzer

[11] Patent Number: 4,894,788

[45] Date of Patent: Jan. 16, 1990

[54] METHOD FOR POSITIONING A TOOL OF A MULTI-JOINT ROBOT

[75] Inventor: Joerg Stelzer, Erlangen, Fed. Rep. of Germany

[73] Assignee: Siemens Aktiengesellschaft, Munich, Fed. Rep. of Germany

[21] Appl. No.: 184,371

[22] Filed: Apr. 21, 1988

[30] Foreign Application Priority Data

May 4, 1987 [DE] Fed. Rep. of Germany ....... 3714806

[51] Int. Cl.$^4$ ............................................. G06F 15/46
[52] U.S. Cl. ................................ 364/513; 318/568.19; 318/568.22; 364/474.35; 364/474.36; 901/2
[58] Field of Search .............. 364/513, 167.01, 474.28, 364/474.35, 474.36; 318/568, 568.11, 568.15, 568.19, 568.22; 901/2, 15

[56] References Cited

U.S. PATENT DOCUMENTS

| | | | |
|---|---|---|---|
| 4,580,229 | 4/1986 | Koyama et al. | 364/513 |
| 4,593,366 | 6/1986 | Sugimoto et al. | 364/513 |
| 4,604,716 | 8/1986 | Kato et al. | 364/174 X |
| 4,621,332 | 11/1986 | Sugimoto et al. | 364/513 |
| 4,663,726 | 5/1987 | Chano et al. | 364/513 |
| 4,763,276 | 8/1988 | Perreirra et al. | 901/15 X |

OTHER PUBLICATIONS

C. Chevallereau et al., "Efficient Method for the Calculation of the Pseudo Inverse Kinematic Problem", Apr. 3, 1987, pp. 1842–1848; Proc. 1987 IEEE Intl. Conf. Div. Robotics and Automation.
J. Chen et al., "Positioning Error Analysis for Robot Manipulators with all Rotary Joints", Apr. 10, 1986, pp. 1011–1016; Proc. 1986 IEEE Intl. Conf. on Robotics and Automation, Apr. 1986.
Patent Abstracts of Japan, Band 10, No. 380 (p.528[2437], Dec. 19, 1986.
R. P. Paul, "Robot Manipulators", pp. 85–117, 1981; The MIT Press, Cambridge (Mass.) and London (GB).

Primary Examiner—Joseph Ruggiero
Attorney, Agent, or Firm—Kenyon & Kenyon

[57] ABSTRACT

A method for positioning a tool of a multi-joint robot is disclosed in which an incorrect positioning of the tool resulting from nonideal geometrical relationships is compensated by the following steps: determining a preliminary desired angular position for each of the joints for a desired position in space of the tool based upon the reference distances and joint axis directions required to position the tool in the desired position; determining the positioning error of the tool due to the difference between the reference distances and the desired directions and the actual spacings and actual directions of the joints; transforming the determined positioning error into corresponding angular correction values for the preliminary desired angular positions of the joints by means of an inverse Jacobi matrix coordinate-transformation equation system; calculating the error-corrected angular position for each of the joints by addition of the angular correction values to the preliminary desired angular positions; and moving the tool to the desired position by rotating the joints in accordance with the error-corrected angular position calculated.

1 Claim, 2 Drawing Sheets

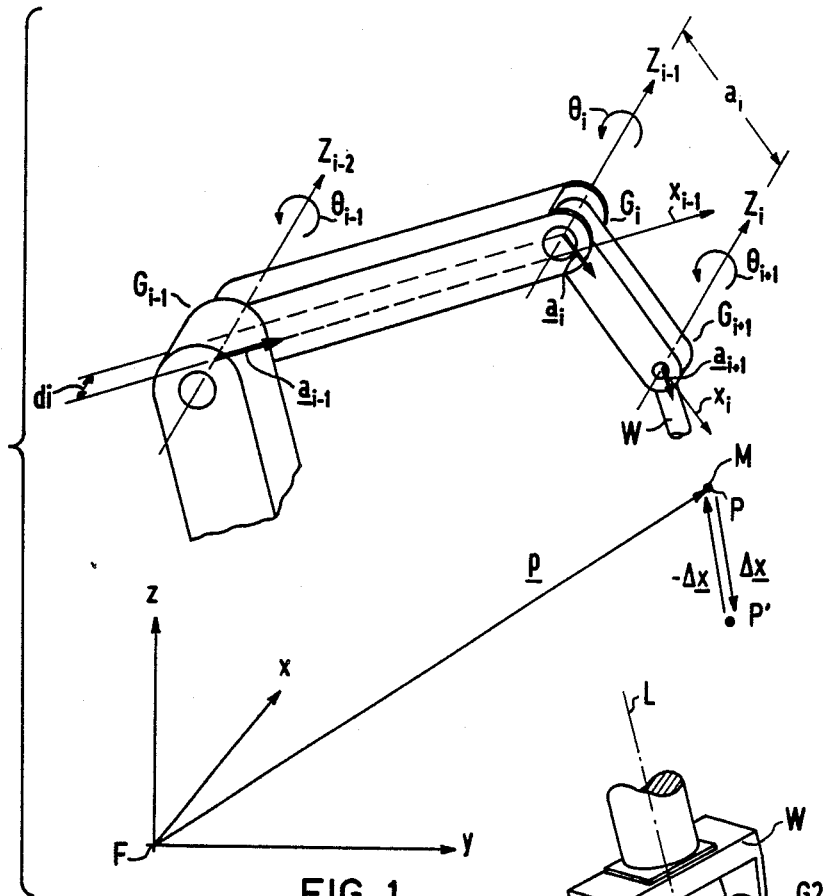
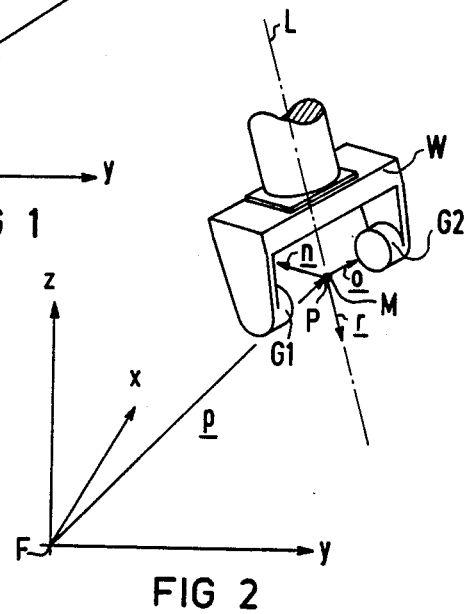
FIG 1
FIG 2

METHOD FOR POSITIONING A TOOL OF A MULTI-JOINT ROBOT

BACKGROUND OF THE INVENTION

This invention relates generally to a method for positioning a tool of a multi-joint robot and more specifically, to a positioning method wherein the position, i.e., the location and the orientation of the tool is given in a reference coordinate system and the actual position of the tool relative to the reference coordinate system and the angular positions of the robot joint axes are linked by a coordinate-transformation system of equations. The parameters of the coordinate-transformation equations are determined by the reference distances and the reference directions of the robot joints. The word "tool" as used herein encompasses all devices which can be considered as the hand part of a robot.

Relatively complex coordinate-transformation equation system must be taken into consideration when positioning a tool in multi-joint robots. The actual position of the tool is calculated from the actual angular positions of the robot joints and from the parameters which describe or represent the geometry of the robot, such as the distances and directions of the joint axes. The position of the tool which gives its location and its orientation is referenced by a coordinate system, the origin of which is usually located at the base of the robot. In order to calculate the corresponding angular positions of the robot joints required to bring the tool to a given position, a predetermined position (relative to the reference coordinate system) and the geometry parameters are input into the coordinate-transformation equations systems. Such a method is known from R. B. Paul, "Robot Manipulators", Chapter 2, The MIT Press, Cambridge, (Mass.) and London (GB), 1981.

However, since the actual robot geometry is not ideal in practice, error inducing problems arise, such as the individual joint axes having incorrect angles relative to each other; and actual distances, directions and/or joint spacings being different from the desired distances. These problems lead to errors in the positioning of the tool. Although these errors could be avoided by modification of the corresponding parameters in the coordinate-transformation equation systems, this solution would require an extremely costly numerical coordinate transformation.

SUMMARY OF THE INVENTION

The present invention solves these problems by determining and compensating for positioning errors occurring due to the actual robot geometry through use of the actual distances and actual directions of the joints relative to the ideal robot geometry reference distances and reference directions of the joints, such tattle positioning accuracy of robots is improved.

More specifically, the present invention solves the problems by use of the following steps:

(a) determining a preliminary desired angular position for each of the joints for a desired position in space of the tool based upon the reference distances and joint axis directions required to position the tool in the desired position;

(b) determining the positioning error of the tool due to the difference between the reference distances and the desired directions and the actual spacings and directions of the joints;

(c) transforming the determined positioning error into corresponding angular correction values for the preliminary o desired angular positions of the joints by means of an inverse Jacobi matrix coordinate-transformation equation system;

(d) calculating the error-corrected angular position for each of the joints by addition of the angular correction values determined in step (c) to the preliminary desired angular positions determined in step (a); and (e) moving the tool to the desired position by rotating the joints in accordance with the error-corrected angular position calculated in step (d).

An advantage of this method is that the error compensation can be carried out analytically in a relatively simple manner.

BRIEF DESCRIPTION OF THE DRAWING

An illustrative example of the invention is shown in the drawing which consists of the following figures.

FIG. 1 illustrates a perspective view of a robot arm having three joints and a reference coordinate system.

FIG. 2 illustrates a perspective view of a tool carrier which may be attached to one of the joints of the robot arm shown in FIG. 1 and a reference coordinate system.

DETAILED DESCRIPTION

Figure 3:
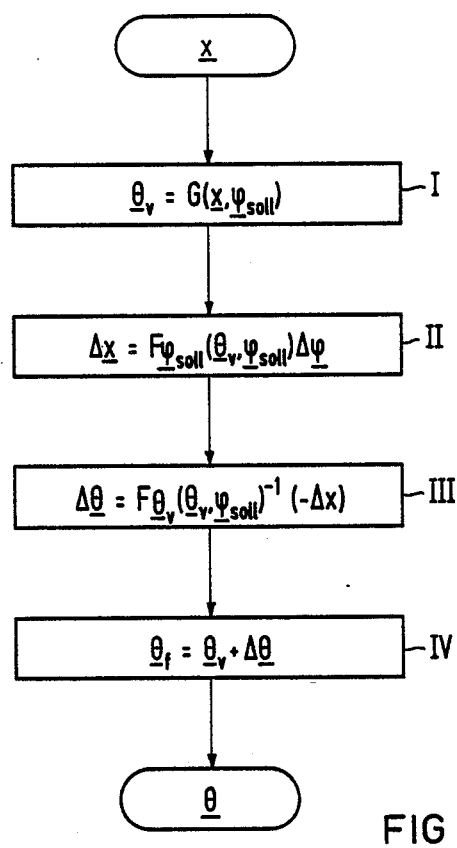
FIG. 3 illustrates a flow diagram showing the principle of method of the present invention operates to position a robot.

The following list of reference symbols should be referred to in conjunction with this description.

| List Of Reference Symbols | |
|---|---|
| $G_{i-1}, G_i, G_{i+1}$ | rotary joints |
| $z_{i-2}, z_{i-1}, z_i$ | z axes |
| $\underline{a}_{i-1}, \underline{a}_i, \underline{a}_{i+1}$ | normal vectors |
| $x_{i-1}, x_i$ | x axes |
| W | tool |
| M | center of tool |
| P | point in space |
| F | base point of robot |
| $\underline{p}$ | locus vector |
| $\underline{o}$ | unit vector |
| $\underline{r}$ | unit vector |
| $\underline{n}$ | unit vector |
| L | longitudinal axis of tool |
| G1, G2 | gripping surfaces of tool |
| $\theta_{i-1}, \theta_i, \theta_{i+1}$ | angles |
| $a_i$ | distance |
| $d_i$ | distance |
| $\underline{x}$ | position of tool carrier |
| $\Delta \underline{x}$ | positioning error |
| $\rho_{ref}$ | reference parameter vector |
| $\theta_v$ | vector of the preliminary angle positions |
| P' | point in space |
| $\Delta \rho$ | geometry error vector |
| $\Delta \underline{\theta}$ | differential vector of the joint angle positions |
| $\underline{\theta}_f$ | error compensated angle vector |

In FIG. 1, a robot arm section having three rotary joints $G_{i-1}$, $G_i$ and $G_{i+1}$, of an n-axis robot is shown. Each of the joints is associated with a separate Cartesian coordinate system, where the subscript of the coordinate system in question is 1 less than that of the respective joint $G_{i-1}$, $G_i$ and $G_{i+1}$.

The respective z axes $Z_{i-2}$, $Z_{i-1}$, $Z_i$ coincide with the respective axes of rotation of the joint $G_{i-1}$, $G_i$, $G_{i+1}$.

A normal vector $a_{i-1}$, $a_i$, $a_{i+1}$ associated with each of the joints $G_{i-1}$, $G_i$, $G_{i+1}$ is located at the center of the respective joint $G_{i-1}$, $G_i$, $G_{i+1}$ and points in the direction of the next joint. For instance, the normal vector $\underline{a}_{i-1}$ points in the direction of the joint $G_i$, and the normal vector $\underline{a}_i$ points in the direction of the joint $G_{i+1}$.

Each respective x axis $x_{i-1}$, $x_i$ is located in the extension of the respective normal vector $\underline{a}_{i-1}$, $\underline{a}_i$, such that it runs parallel to the section of the robot arm fastened to the joint $G_{i-1}$, $G_i$ where the latter represents the shortest connection distance to the next respective joint. The $x_{i-2}$ axis, which is associated with the joint $G_{i-1}$, is not shown and cannot be determined since its direction depends on the normal vector $\underline{a}_{i-2}$ of the joint $G_{i-2}$ (not shown). The y axes do not contribute to an understanding of the invention and therefore are not shown for the sake of clarity. The joint $G_{i+1}$ is fastened to the hand part of a robot arm, which may be tool W, such as that shown in connection with FIG. 2 and subsequently discussed. It can also be seen from in FIG. 1 and FIG. 2 that the center M of the tool W coincides with a point P.

Further shown in FIG. 1 is a Cartesian coordinate system which is used as the reference coordinate system. Its origin (x, y, z)=(0, 0, 0) is located at the schematically illustrated base F of the robot. However, it also could be located at any other point in space. The center M of the tool W (which is not shown completely) coincides with the point P in the position of the robot arm shown and can be described by a locus vector $\underline{p}$ in relation to the base point F. Before discussing the other elements of FIG. 1, the positioning of the tool W is described below in connection with FIG. 2.

FIG. 2 is a perspective view of the tool W. Positioning of the location and orientation of the tool W is carried out in relation to the reference coordinate system at the base F of the robot, described in FIG. 1, and is referenced by a Cartesian coordinate system associated with the tool W having the unit vectors $\underline{n}, \underline{o}, \underline{r}$ which form, in this order, a righthand system. The origin of this coordinate system lies at the center M of the tool W. The center $\underline{r}$ lies in the longitudinal axis L (indicated by dashed-dot lines) and points in the direction in which the tool W can seize an object, such as a workpiece. The vector $\underline{o}$ points from the gripping surface G1 to the gripping surface G2. The vector $\underline{n}$ is perpendicular to the vectors $\underline{r}$ and $\underline{o}$. With respect to the coordinate system at the base F of the robot, the vectors $\underline{n}, \underline{o}$ and $\underline{r}$ have components in the x, y and z direction which may be designated as $n_x, n_y, n_z$; $o_x, o_y, o_z$; and $r_x, r_y, r_z$, respectively. For the sake of clarity, these components are not shown but will be referred to subsequently in the explanation of a transformation matrix.

If certain angles $\theta_{i-1}$, $\theta_i$, $\theta_{i+1}$ are set at the rotary joints $G_{i-1}$, $G_i$, $G_{i+1}$, the center M of the tool carrier W is positioned to a certain point in space. The location of the center M and the orientation of the tool carrier W depends upon the geometric parameters of the robot arm, in addition to the angles $\theta_{i-1}$, $\theta_i$, $\theta_{i+1}$. For a given rotary joint, e.g., the Denavit-Hartenberg convention as follows:

$a_i$ : is the length of the common normal between the axis of the $i^{th}$ and the axis of the $(i+1)^{th}$ joint.

$d_i$ is the spacing between the straight lines through the normal vectors $\underline{a}_i$ and $\underline{a}_{i-1}$ . $\alpha_i$ is the angle between the $(i+1)^{th}$ and the joint axis.

The spacings $a_i$ and $d_i$ are shown if FIG. 1. In FIG. 1, the angle $\alpha_i$ is not shown since it is equal to zero in this illustration. This angle attains a value greater than zero if the joint axis of the $(i+1)$joint is rotated counterclockwise in the $y_i$, $z_i$ plane relative to the joint axis of the ijoint. Due to manufacturing tolerances, for instance, this angle can attain a value greater than zero even in joints designed to be parallel.

In the example shown, only the angles $\theta_{i-1}, \theta_i, \theta_{i+1}$ are variable. The calculations for joint $G_i$ follows below. The calculations for joints $G_{i-1}$ and $G_{i+1}$ would be performed in a similar manner.

$\theta_i$: is the angle between the normal vectors $\underline{a}_{i-1}$ and $\underline{i}_i$. The direction of the angle is indicated in FIG. 1 by arrows looped around the respective axis of rotation.

If translatory joints were provided, the selection of parameters would be different; however, the following described positioning method would be applicable in principle in the same manner.

With the parameters introduced above, a 4-row and a 4-column joint matrix can be constructed for each joint $G_{i-1}$, $G_i$, $G_{i+1}$ although only the matrix for the joint $G_i$ will be discussed herein.

$$A_i = \begin{pmatrix} \cos\theta_i & -\sin\theta_i \cdot \cos\alpha_i & \sin\theta_i \cdot \sin\alpha_i & a_i \cdot \cos\theta_i \\ \sin\theta_i & \cos\theta_i \cdot \cos\alpha_i & -\cos\theta_i \cdot \sin\alpha_i & a_i \cdot \sin\theta_i \\ 0 & \sin\alpha_i & \cos\alpha_i & d_i \\ 0 & 0 & 0 & 1 \end{pmatrix} \quad (1)$$

Multiplication of all of the joint matrices of a robot results in a transformation matrix which can be represented as a vector $\underline{x}$ containing the position (location and orientation) of the tool carrier W relative to the base point F. This transformation matrix has the following general form:

$$x = \begin{pmatrix} n_x & o_x & r_x & p_x \\ n_y & o_y & r_y & p_y \\ n_z & o_z & r_z & p_z \\ 0 & 0 & 0 & 1 \end{pmatrix} \quad (2)$$

The elements $n_x, n_y, n_z, o_x, o_y, o_z$ and $r_x, r_y, r_z$ of the vector $\underline{x}$ give the orientation of the tool W, as described in FIG. 2. The elements $p_x, p_y$ and $p_z$ are the components of the base-related vector $\underline{p}$ in the x, y and z direction which represents the location of the center M of the tool W. From the multiplication of all n joint matrices of the robot ($\ldots A_{i-1}, A_i, A_{i+1} \ldots$) it is seen that the matrix elements are obtained as functions of the angles $\ldots \theta_{i-1}, \theta_i, \theta_{i+1}$ and from the parameters $\ldots a_{i-1}, a_i, a_{i+1} \ldots, \ldots d_{i-1}, d_i, d_{i+1} \ldots, \ldots \alpha_{i-1}, \alpha_i, \alpha i+1 \ldots$ If all of the parameters describing the robot are combined in one vector $\underline{\phi}$ and the angular positions of all of the robot joints are combined in the vector $$\theta = \begin{pmatrix} \cdot \\ \cdot \\ \theta_{i-1} \\ \theta_i \\ \theta_{i+1} \\ \cdot \\ \cdot \end{pmatrix} \quad (3)$$

then, the vector $\underline{x}$ can be described quite generally as a function of $\underline{\phi}$ and $\underline{\theta}$ from which, when the parameters and angular position are known, the position of the tool W can be determined. The mathematical description for this is:

$$\underline{x} = F(\underline{\theta}, \underline{\phi}) \tag{4}$$

From this function, an inverse function $$\underline{\theta} = G(\underline{x}, \underline{\phi}) \tag{5}$$

can be formed, from which, for a given position of the tool W (vector $\underline{x}$) and from the parameters combined in the vector $\underline{\phi}$, the angular positions of the respective robot joints ... $\theta_{i-1}, \theta_i, \theta_{i-1}$ ... which are represented by the vector $\underline{\theta}$ can be calculated.

The parameters ... $a_{i-1}, a_i, a_{i+1}, \ldots d_{i-1}, d_i, d_{i+1} \ldots, \ldots \alpha_{i-1}, \alpha_{i+1}$ ... relate to ideal robot geometry and in particular to the fact that the members which connect the joints are ideal straight lines and the plane in which the axes lie are mutually parallel. However, in practice this is not always the case. Slight deviations from the ideal geometry which can be caused, for instance, by manufacturing tolerances, lead to faulty positioning (faulty location and faulty orientation) of the tool W, as can be expressed by a vector $\Delta\underline{x}$(FIG. 1). The compensation of this error is the subject of the invention.

In order to position the tool W of the robot according to FIG. 1 to the point P which is described by the vector $\underline{p}$ by the base F (or by another reference system in space), the angular positions $\underline{\theta}$ for the joints ... $G_{i-1}, G_i, G_{i+1}$ ... of the robot arm are calculated according to Equation 2. Due to the nonideal geometry conditions of the robot, i.e., due to the actual spacings and actual directions of the joints, the tool W, however, would be located at a point P', from the desired point P if the calculated angles were used to position the robot joints. The distance of this point P', from the desired point P and the deviation in orientation from the reference orientation of the tool W between the point P' and the point P is characterized by the vector $\Delta\underline{x}$. The position of the tool W must be corrected by the vector $-\Delta\underline{x}$, in order for the robot, which in actuality has imperfect geometry, to reach the point P in the desired manner.

Figure 4:
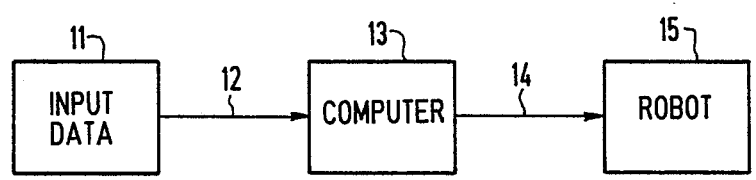

In FIG. 3, a flow diagram is illustrated which schematically shows the principle of geometrical-error o compensation as a positioning process in a data processing unit associated with the robot as shown in FIG. 4. In order to move the tool to a desired point, desired position information 11 is input over line 12 to the data processing unit of an associated computer 13. The below described data processing is carried out in computer 13 which then sends signals over line 14 in conventional fashion to position robot 15 to the desired point.

In the first step I, a vector $\underline{\theta}_v$ representing the preliminary axis positions (indicated by the subscript v) can be determined within the data processing unit of computer 13. The preliminary angular position vector, $\underline{\theta}_v$ is determined from the coordinate $\underline{x}$ inputed for the desired position of the tool W and from the reference parameter vector $\phi$ ref, the elements of which describe the ideal geometry values, i.e., the desired distances and desired directions of the joints of the robot.

In the second step, an error calculation is performed in which the error $\Delta\underline{x}$ which is brought about the deviation of the actual distances and actual positions of the robot joints from the ideal geometry of the robot is calculated. To this end, a geometry vector $\Delta\underline{\phi}$ which represents the difference between the reference parameters and the actual parameters is determined as follows:

$$\Delta\underline{\phi} = \text{ref} - \underline{\phi}\text{ist} \tag{6}$$

and then is multiplied by the partial derivative of the function Equation (4) with respect to $\underline{\phi}$ ref, such that the vector $\Delta\underline{x}$ is obtained from:

$$\Delta\underline{x} = \frac{\partial F(\underline{\theta}_v, \underline{\phi}\text{ref}) \Delta\underline{\phi}}{\delta\phi\text{ref}} \tag{7}$$

In the flow diagram of FIG. 3, this relationship is represented by the notation:

$$\Delta\underline{x} = F\underline{\phi}\text{ref}(\underline{\theta}_v, \underline{\phi}\text{ref})\Delta\underline{\phi} \tag{8}$$

shown as the second step II in FIG. 3 (see also Bronstein, "Taschenbuch der Mathematik", Leipzig, 1983, 21 st Edition, page 100). The geometry vector $\Delta\underline{\phi}$ is obtained by measuring the actual directions and actual distances of the robot joints and determining the difference from the reference directions and reference distances. The then calculated $\Delta\underline{x}$ represents the deviation of the tool position, due to the actual distances by actual orientation, from the desired reference position (see also FIG. 1). In order to compensate for this incorrect position, the angular settings of the rotor joints must be varied slightly in a certain manner. To accomplish this, the positioning error $\underline{x}$ is transformed in a third process step III into differential changes of the preliminary joint angle positions $\theta v$ which are represented by a vector $\Delta\underline{\theta}$. A determination of the vector $\Delta\underline{\theta}$, first requires the following discussion.

If it is assumed that the incorrect positioning results from errors of the joint angle positions which are described by the vector $\Delta\underline{\theta}$ hypothetically assumed as known, the vector $\Delta\underline{x}$ could be determined, by analogy to Equation 8, from $$\Delta\underline{x} = F\underline{\theta}v(\underline{\theta}v,\underline{\phi}\text{ref})\Delta\underline{\theta} \tag{9}$$

where the function $$F\underline{\theta}v(\underline{\theta}v,\underline{\phi}\text{ref}) \tag{10}$$

is the Jacobi matrix of the function
$$F(\underline{\theta}v, \underline{\phi}\text{ref}) \tag{11}$$

(see Bronstein, previously discussed, at page 280). If Equation 9 is multiplied from the left by the inverse Jacobi matrix which is represented by $$F\underline{\theta}(\underline{\theta}v, \underline{\phi}\text{ref})^{-1} \tag{12}$$

the formula described in step III is obtained, except for the minus sign. The minus sign results from the requirement that the change of the joint angle positions must be calculated for the vector directed opposite to $\Delta\underline{x}$.

The Jacobi matrix and its inverse can be advantageously determined analytically. The methods for determining it are discussed, for instance, in "Robot Manipulators" by R. B. Paul, previously discussed, at Chapter 4.

In the fourth step IV, the final error-compensated value of the angle positions $$\underline{\theta}_f = \underline{\theta}v + \Delta\underline{\theta} \tag{13}$$

is determined from the preliminary joint settings $\underline{\theta}v$ calculated in the first step I, and the axis angle changes $\Delta\underline{\theta}$ calculated in the third step III. The subscript f indicates that the error compensation has been made.

What is claimed is:

1. A method for positioning a tool of a multi-joint robot having a plurality of rotatable joints ($G_{i-1}$, $G_i$, $G_{i+1}$) defining robot joint axes, with one of the joints being connected to the tool and the location and the orientation of the tool being represented in a reference coordinate system and the respective position of the tool relative to the reference coordinate system and the angular positions of the robot joint axes being linked by a coordinate-transformation equation system having parameters which are determined by the desired distances and desired directions of the robot joints representing the ideal kinematic of the robot, comprising the following steps:

(a) determining a preliminary desired angular position ($\theta_{i-1}$, $\theta_i$, $\theta_{i+1}$) for each of the joints, respectively, for a desired position in space ($\underline{x}$) of the tool based upon reference distances ($a_{i-1}$, $a_i$, $a_{i+1}$ $d_{i-1}$, $d_i$, $d_{i+1}$) and directions of the joint axes required to position the tool in the desired position;

(b) determining the positioning error ($\Delta\underline{x}$) of the tool due to the difference between the reference distance ($a_{i-1}$, $a_i$, $a_{i+1}$, $d_{i-1}$, $d_i$, $d_{i+1}$) and the desired directions and the actual spacings and actual direction of the joints ($G_{i-1}$, $G_i$, $G_{i+1}$);

(c) transforming the determined positioning error ($\Delta\underline{x}$) into corresponding angular correction values ($\Delta\underline{\theta}$) for the preliminary desired angular positions ($\theta_{i-1}$, $\theta_i$, $\theta_{i+1}$) of the joints ($G_{i-1}$, $G_i$, $G_{i+1}$) by means of the inverse Jacobi matrix ($F\underline{\theta}(\underline{\theta}_v,\underline{E}_{ref})^{-1}$) of the ideal kinematic of the robot of the coordinate-transformation equation system;

(d) calculating the error-corrected angular position ($\underline{\theta}_f$) for each of the joints ($G_{i-1}$, $G_i$, $G_{+1}$) by addition of the angular correction values ($\Delta\underline{\theta}$) determined in step c) to the preliminary desired angular positions ($\theta_{i-1}$, $\theta_i$, $\theta_{i+1}$) determined in step a); and (e) moving the tool to the desired position by rotating the joints in accordance with the error-corrected angular position ($\underline{\theta}_f$) calculated in step (d).

* * * * *